(12) United States Patent
Gupta et al.

(10) Patent No.: US 7,972,114 B2
(45) Date of Patent: Jul. 5, 2011

(54) COMPOSITE BLADE ROOT STRUCTURE

(75) Inventors: Neil Gupta, Costa Mesa, CA (US); Abe Karem, N. Tustin, CA (US)

(73) Assignee: Karem Aircraft, Inc., Lake Forest, CA (US)

( * ) Notice: Subject to any disclaimer, the term of this patent is extended or adjusted under 35 U.S.C. 154(b) by 233 days.

(21) Appl. No.: 12/397,833

(22) Filed: Mar. 4, 2009

(65) Prior Publication Data
US 2009/0226325 A1 Sep. 10, 2009

Related U.S. Application Data

(60) Provisional application No. 61/033,738, filed on Mar. 4, 2008.

(51) Int. Cl.
*B64C 11/24* (2006.01)
(52) U.S. Cl. .......................................... 416/226; 416/239
(58) Field of Classification Search .................. 416/226, 416/239, 248, 230
See application file for complete search history.

(56) References Cited

U.S. PATENT DOCUMENTS

| | | | | |
|---|---|---|---|---|
| 2,754,916 | A | * | 7/1956 | Woolf ............................ 416/232 |
| 3,112,797 | A | * | 12/1963 | Reichelt .......................... 416/226 |
| 3,476,625 | A | * | 11/1969 | Slivinsky et al. ................. 156/86 |
| 3,734,642 | A | | 5/1973 | Dixon et al. |
| 3,765,124 | A | * | 10/1973 | Ferris et al. ..................... 416/226 |
| 3,768,922 | A | * | 10/1973 | Dixon .............................. 416/61 |
| 4,079,903 | A | * | 3/1978 | Ashton et al. ................. 244/123.5 |
| 4,251,309 | A | | 2/1981 | Class et al. |
| 4,494,910 | A | * | 1/1985 | Hahn et al. ..................... 416/226 |
| 4,538,780 | A | * | 9/1985 | Roe .............................. 244/123.5 |
| 4,642,028 | A | * | 2/1987 | Buckman et al. ................. 416/95 |
| 4,810,167 | A | | 3/1989 | Spoltman et al. |
| 5,129,787 | A | * | 7/1992 | Violette et al. ................. 416/226 |
| 6,007,298 | A | | 12/1999 | Karem |
| 6,024,325 | A | | 2/2000 | Carter |
| 6,155,784 | A | | 12/2000 | Carter |
| 6,196,066 | B1 | | 3/2001 | Barbier |
| 6,220,545 | B1 | | 4/2001 | Fenny et al. |
| 6,447,254 | B1 | * | 9/2002 | Holowczak et al. .......... 416/224 |
| 6,641,365 | B2 | | 11/2003 | Karem |
| 6,666,651 | B2 | * | 12/2003 | Rust .......................... 416/204 R |
| 6,942,455 | B2 | * | 9/2005 | Schmaling et al. ............. 416/23 |
| 6,986,642 | B2 | * | 1/2006 | Carter ........................... 416/139 |
| 7,165,945 | B2 | * | 1/2007 | Kovalsky et al. .............. 416/226 |
| 2006/0110256 | A1 | * | 5/2006 | Gigas et al. ................. 416/229 R |
| 2008/0310964 | A1 | * | 12/2008 | Llorente Gonzalez et al. ............................ 416/226 |

* cited by examiner

*Primary Examiner* — Justine R Yu
*Assistant Examiner* — Aaron R Eastman
(74) *Attorney, Agent, or Firm* — Fish & Associates, PC

(57) ABSTRACT

A spar of a rotor blade having moderate depth transitions to a relatively much deeper shank over a relatively short distance. This rapid transition enables a low-weight blade root that is structurally efficient, offers a high moment capability, and enables high Mach number axial flow. A transition could advantageously reduce section depth by at least 15%, 20%, 30%, or even 40% over at most 5%, 6%, 10%, or 12% of a total length of the rotor blade. Such a transition could advantageously be accomplished using a cuff, which has interfaces with each of the spar and the shank. The rotor blade shank has a generally circular cross-section which allows for a rotary attachment to a hub, where the attachment may advantageously comprise a mechanical or elastomeric bearing. Preferred embodiments have a spar with a generally rectangular cross-section.

13 Claims, 6 Drawing Sheets

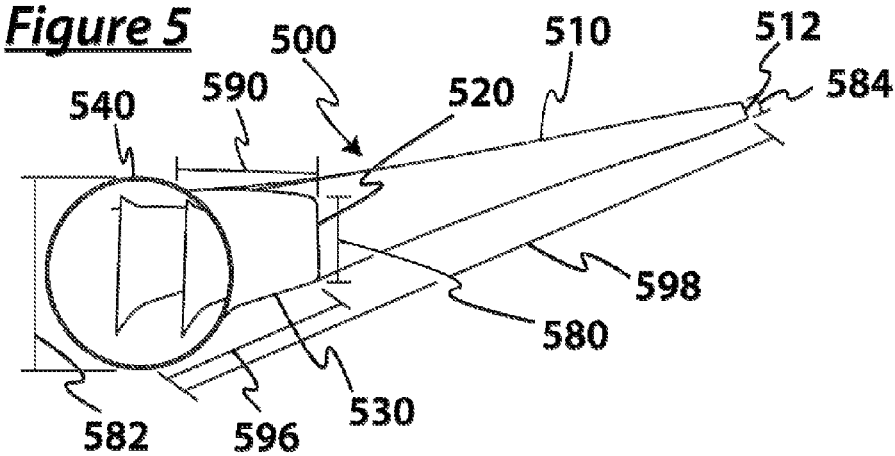
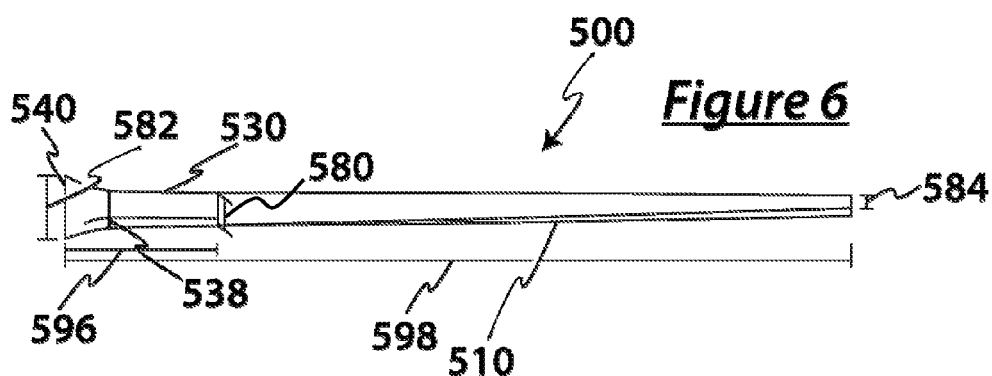
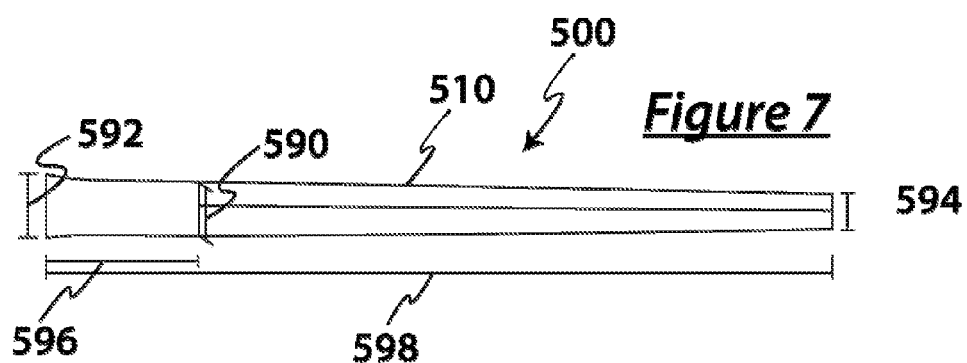

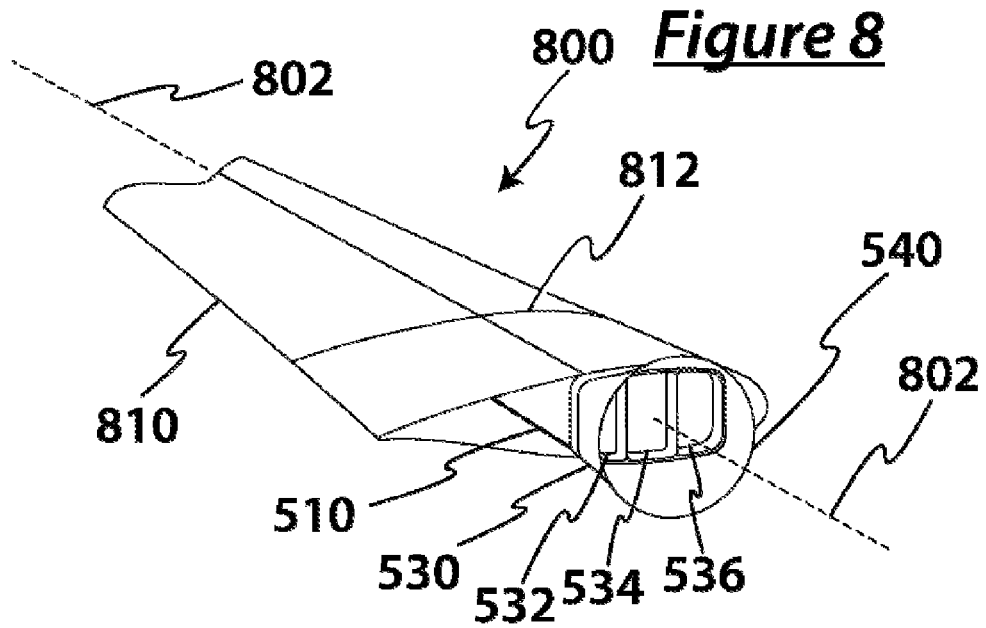
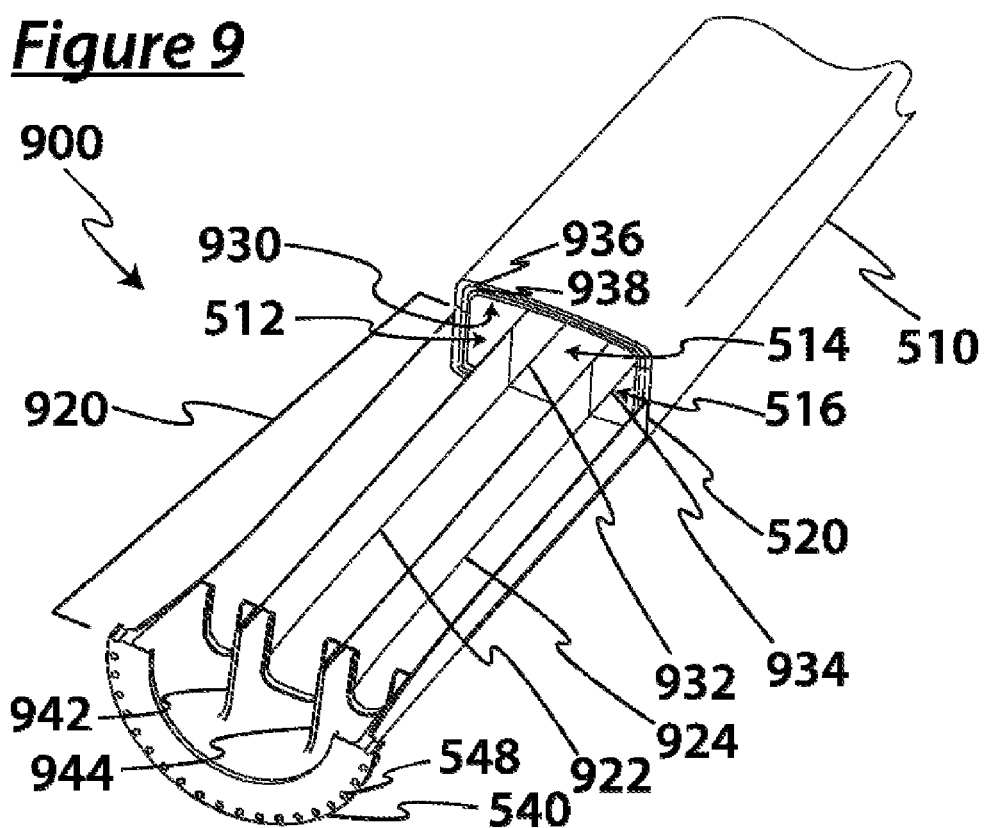

COMPOSITE BLADE ROOT STRUCTURE

This application claims priority to U.S. Provisional Application Ser. No. 61/033,738 filed Mar. 4, 2008 which is incorporated by reference herein in its entirety.

FIELD OF THE INVENTION

The field of the invention is composite structures.

BACKGROUND

A lift generating blade has been a key component in aircraft propulsion since the inception of powered flight. As with most aircraft structures, performance and structural margins are thin, and therefore blade structures are usually designed to provide the highest practical strength-to-weight and stiffness-to-weight ratios within bounding airfoil profiles. Blade structures, chosen for efficiency in blade bending, commonly take the form of a simple I-beam or box beam centered at the thickest portion of the blade airfoil profile. In some more advanced designs the box beam may be multi-celled to help prevent buckling while allowing for minimum thickness box upper and lower surfaces (often referred to as the beam caps). In addition to the demanding requirements on the blade to act as an efficient beam in bending, many rotor and propeller blades must rotate about their long axis (termed blade feathering axis or blade pitch axis), to provide variable thrust or lift. This necessitates that the airfoil shape of the blade transition to a circular shape or that the blade be mechanically fastened to a rotating member. This circular beam root shape is less effective than a comparably sized (in terms of area) box beam or I-beam in bending. The inefficiency of the circular shape is compounded by the characteristic of cantilevered beams to have a maximum moment at the root of the beam, thus making the beam root region the most important for beam stiffness.

Across the spectrum of aircraft applications for lift-generating blade structures there are a wide variety of configurations that create different demands on the blade structure. Although strength, weight and stiffness are important for most blade structures, several other factors are involved that are application specific and vary between aircraft configurations. A blade structure in a vertical lift application such as that found in a conventional helicopter rotor has very different constraints compared to those of a horizontal flight vehicle such as a propeller aircraft.

In the case of a conventional helicopter rotor blade, the root of the blade is often hinged, and thus there are little or no bending moments present at the root of the blade structure. The blade is kept radially extended and somewhat stiffened by the centrifugal force as the blade spins around the center axis. This centrifugal force helps to relieve bending in the blade beam and the presence of a hinge at the root eliminates the build up of bending loads from the tip to the root of the blade. The airflow through the rotor disk in a hovering helicopter (commonly termed axial flow) and the edgewise airflow in helicopter forward flight near the rotor axis of rotation are relatively slow, and thus the aerodynamic shape of the blade of a conventional helicopter near the root is not critical to rotor performance.

A typical prior art helicopter rotor blade root and rotor hub attachment can be seen in FIG. 1, adapted from U.S. Pat. No. 4,251,309 to Class, et al. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply. In FIG. 1 the blade root 100 comprises an inboard blade aerodynamic portion 120, an unfaired structural root portion 110, and a hub attachment 130. The rectangular box shape in the blade structure 110 continues through to a pinned or otherwise mechanically fastened joint to the hub assembly, which allows the blade to feather or pitch about the blade long axis. In this configuration both the structural beam bending requirements and the aerodynamic constraints due to axial and edgewise flow are relatively low. Thus it can be seen that the structure is not faired, and the blade beam is not optimized for bending.

In the case of an aircraft propeller; the system of blades is moving in the axial direction at a much greater speed than a helicopter (as high as Mach 0.75). Due to these high axial flow rates, the aerodynamic profile of the blade root is critical to the high speed performance of the propeller system. However, unlike helicopter blades, the propeller blade does not support the weight of the aircraft in vertical flight, and is usually of a much smaller overall diameter. Thus the moment loads at the root of the propeller blade are relatively low, and the blade-to-hub attachment depth can be much thinner. As can be seen in FIG. 2, adapted from U.S. Pat. No. 6,155,784 to Carter, a prior art propeller assembly 200 comprises a blade aerodynamic lifting surface portion 210, a blade structure or spar portion 220, a blade shank and rotation portion 230, and a spinner fairing portion 240. It can be seen the transition from the lifting surface portion 210 to the blade shank and rotation portion 230, can be rapid and still provide propeller aerodynamic efficiency without undue weight.

FIG. 3, adapted from U.S. Pat. No. 4,810,167 to Spoltman, et al., shows a prior art propfan rotor propulsion system 300. Such a system is designed for very high axial speeds of Mach 0.7 to 0.8, and a resulting blade 310 is very thin even at the root section, where it abruptly terminates at a circular turntable 320, used for feathering the blade 310. Such a thin blade has a low capacity for carrying root bending moments.

In the case of a tilt-rotor aircraft both hover and forward flight regimes are possible. When a tiltrotor aircraft operates in airplane cruise mode, the propeller or proprotor operates in substantially high axial flow, (above Mach 0.45). A tiltrotor aircraft usually also has the capability of operating as a helicopter, where axial flow rates are low. Known prior art flying tiltrotor aircraft have what is termed a gimbaled rotor, which allows the rotor to pivot about its center, thus substantially preventing the transfer of high blade root moment loads to the fixed-system hub or mast. In such assemblies, the blade root is typically kept faired close to the hub fairing so that in forward flight the propeller is aerodynamically efficient. However, because moment loads are low in the gimbaled rotor blade, the root structural shape is usually a round spar, structurally inefficient, but simpler in geometry and manufacture for the transition from blade lifting surface portion to blade shank and rotation mechanism.

Hingeless rotor helicopters are known in the prior art. In these designs the rotor blade is cantilevered at the root both in blade bending up-down (termed flap) and in forward-aft (termed lag) while supported on mechanical or elastomeric feather bearings. Such a rotor can be configured to provide rotor control moments for aircraft roll and pitch that are not possible with conventional gimbaled helicopters. In this case, a rotor blade root moment is developed, but as in other helicopters, the axial flow rate is low, and thus again the root aerodynamic profile is not critical to rotor performance. An exemplary hingeless rotor system for a helicopter is that of the Optimum Speed Rotor, U.S. Pat. No. 6,007,298 to Karem and implemented on the Boeing™ Hummingbird A160 helicopter.

Some advanced technology composite propeller blades have been manufactured using braided pre-forms or composite winding machines. Composite materials can be tailored to place material in directions only as needed to carry prevailing loads on a structure. In the case of a braided pre-form, a number and direction of fibers is determined for the composite structure and a woven "sock" is created, containing only the fibers required for the loads. This sock is placed dry over a mold, and then infused with resin to make the final composite blade part. A similar manufacturing method is composite winding of structures. The prior art all-composite blade of the Airbus™ A400M transport aircraft is manufactured on a winding machine, carrying all the fiber strands (tows in the industry vernacular) and interweaving them on the part essentially simultaneously.

Both woven performs and wound structures have the drawback that the weave by nature creates a slight bend or kink in the fiber as it moves above or below the crossing fiber. These bends reduce the overall strength of the material in tension and compression. A preferred method to reduce this fiber kinking is to create the structure using unidirectional tapes of fibers. Layering these tapes one on top of the other creates an uninterrupted stronger structure, but can be labor intensive to manufacture. Advances in automated fiber placement machines make it possible to wrap unidirectional composite tapes over large complex parts.

The blades of high speed or high efficiency hingeless or rigid rotors or propellers can greatly benefit from achieving high ratios of strength to weight and stiffness to weight within the thin airfoils required for efficiency at substantial axial or edgewise speed. The use of a combination of a rigid rotor and a tiltrotor aircraft as described in U.S. Pat. No. 6,641,365 to Karem provides several advantages. That lightweight hingeless rotor system allows for variable rotor speed, increasing efficiency in both of the two disparate hover and aircraft flight regimes. In both helicopter and airplane modes, a stiff hingeless rotor provides rotor control moments not achievable in the current gimbaled tiltrotor aircraft. However, in this configuration the rotor blade root is subject to two demanding criteria: The blade root must carry large moment loads during hover, as the entire vehicle is lifted by a large diameter unhinged rotor, and in airplane flight mode the blade root must have low aerodynamic drag as the vehicle could see axial flow rates through the rotor disk approaching Mach 0.65. Therefore, it is apparent that a blade structure optimized for high structural root moment capability at low blade root weight and aerodynamic efficiency at high speed axial flow is still required in the field of hingeless tiltrotor aircraft, and will also substantially benefit hingeless rotor helicopters and compound helicopters with high edgewise speed.

Designs for metal composite blade retention systems have been suggested as in U.S. Pat. No. 3,734,642 to Dixon et al. which suggests one method wherein a composite blade is bonded to an external titanium cuff structure which is in turn bolted to a bearing to allow feathering of the blade. In this design, a backup internal cuff acts as a redundant load path in the case of bond failure on the first cuff to composite interface. A conical flair of the blade root and cuff forces a wedging action between the inner cuff structure and the composite in the event of a primary bond failure. FIG. 4, adapted from the Dixon patent, illustrates a blade root and attachment 400 design comprising a blade spar 410, cuff 430, and attachment to a hub 420. It is important to note that in the Dixon patent and other known prior art designs, the blade spar 420 and cuff 430 both have circular cross sections.

SUMMARY OF THE INVENTION

The present invention provides systems, apparatus, and methods in which a spar of a rotor blade having moderate depth transitions to a relatively much deeper shank over a relatively short distance. This rapid transition enables a low-weight blade root that is structurally efficient, offers a high moment capability, and enables high Mach number axial flow.

It is contemplated, that a transition could advantageously reduce section depth by at least 15%, 20%, 30%, or even 40% over at most 5%, 6%, 10%, or 12% of a total length of the rotor blade. Such a transition could advantageously be accomplished using a cuff, which has interfaces with each of the spar and the shank. The spar and the shank each have a section depth at their respective interface with the transition, and the transition satisfies the limitations that the section depth of the spar at the transition is no greater than 60%, 70%, 75%, or 80% of the section depth of the shank at the transition, and a smallest distance between the interfaces is at most 10% or even 5% of a total length of the rotor blade.

In an especially preferred embodiment, the rotor blade shank has a generally circular cross-section which allows for a rotary attachment to a hub, where the attachment may advantageously comprise a mechanical or elastomeric bearing. Although one of ordinary skill in the art would employ a generally circular spar to interface with a generally circular shank, preferred embodiments have a spar with a generally rectangular cross-section.

As used herein, a cross-section that is "generally rectangular" has a ratio between the square of outer perimeter and area enclosed by said outer perimeter that is between 14 and 40. This definition intentionally includes shapes which are not traditionally thought of as rectangular including, for example, polygons as well as boxy shapes with rounded edges or rounded corners. As used herein, a cross-section that is generally circular has a ratio between the square of outer perimeter and area enclosed by said outer perimeter that is less than 14.

Contemplated shapes and section depths allow for efficient distribution of fiber or other composite materials offering high blade stiffness within the constraints of a blade aerodynamic fairing. It is contemplated that stiffness of a blade spar could be further increased by including at least two internal structural cells in the spar. In some especially preferred embodiments, a composite spar would interface with a metal shank, each comprising structural cells with internal webs, and the internal webs of the spar being advantageously structurally coupled to the internal webs of the shank. It is contemplated that a rotor blade spar configured according to teachings herein and comprising a composite material could achieve a stiffness of at least 80 or 100 lb-in$^2$ per inch of section depth squared/lb weight.

In an especially preferred embodiment, the shank is coupled to a hub, and has a large diameter that allows for efficient transfer of blade bending moments to the hub. Preferred shanks have section depths of at least 16, 20, 24, or even 36 inches. This has special applicability for a hingeless tiltrotor. For such an application, the spar may be advantageously twisted by an angle of at least 20 degrees to facilitate efficient rotor aerodynamic performance.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 5 is an isometric illustration of a preferred rotor blade structure and transition from a spar to a shank.

FIG. 6 is a side-view illustration of the rotor blade structure of FIG. 5, showing a rapid transition from a spar section depth to a shank section depth.

FIG. 7 is a top-view illustration of the rotor blade structure of FIG. 5.

FIG. 8 is a perspective view of the rotor blade structure of FIG. 5, with an aerodynamic fairing installed.

FIG. 9 is a partial cutaway of the rotor blade structure of FIG. 5, showing a preferred root cuff and blade structure.

DETAILED DESCRIPTION

Figure 1:
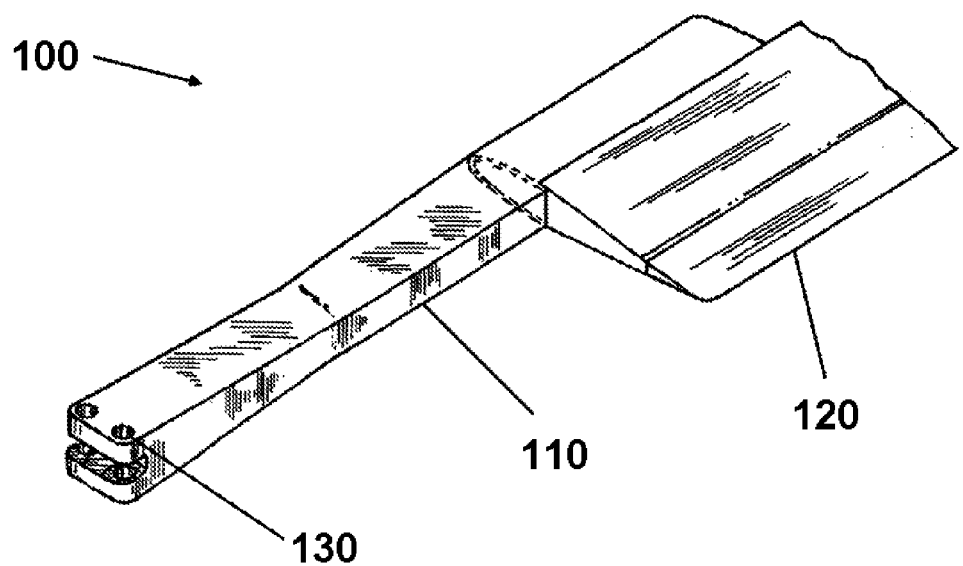
FIG. 1 is an illustration of a prior art helicopter blade root and hub attachment.

Achieving blade structure configured for high structural root moment capability at low blade root weight and aerodynamic efficiency, even with high-speed axial flow, creates a challenge in the design and manufacturing of the blade structure on several fronts. It is contemplated that the demand for a lightweight high bending load capable structure benefits from a multi-cell box beam structure to reduce or eliminate buckling of thin, tailored box cap sections. High speed aerodynamic constraints drive towards a thin blade cross section as close to the spinner fairing as possible, while still transitioning to a round element to allow for attachment to a feather axis system. When applied to hingeless rotors of a tiltrotor aircraft, such a blade root must meet stiffness requirements substantially higher than those of a conventional helicopter rotor, while still weighing substantially less than the weight per unit rotor disk area of a conventional system. The conflicting demands for a thin blade section depth for aerodynamic efficiency, and thick blade section depth for blade bending capacity, are not adequately satisfied in the prior art.

To address these challenges, a structurally efficient rectangular beam is contemplated, in which a blade airfoil shape transitions to a circular interface at a rotating joint on a rotor hub within a short blade length. Preferred interfaces have diameters of at least 16 inches, and more preferably at least 18, 22, 26, or 30 inches. It is thought to be especially advantageous where the interface has a diameter of at least 2.5%, 3% or even 3.5% of the rotor diameter. Unless the context dictates the contrary, all ranges set forth herein should be interpreted as being inclusive of their endpoints. Similarly, all lists of values should be considered as inclusive of intermediate values unless the context indicates the contrary.

In preferred embodiments, a structural beam has a boxy cross section shape containing one or more cells that run along the length of the blade within the outer profile of the airfoil. The boxy shape allows for the cap material of the beam to be far from the neutral axis of the blade within the confines of the airfoil shape, thereby increasing structural efficiency. Multiple cells increase critical buckling strength in the caps. Close to the hub fairing or other blade to hub interface, the rectangular section transitions to a circular cross section to interface with a blade feathering joint. This transition to a circular shape is done within a very limited length of blade, near the root to minimize the effect on the rotor aerodynamic performance and also minimize disturbance of the airflow into an engine inlet, which in most cases is positioned immediately downstream of the blade to hub joint.

The present inventive subject matter allows for the blade structural flap stiffness (measured as modulus of elasticity multiplied by area moment of inertia) to increase as a function of proximity to the rotor center. In an especially preferred embodiment, the flap and lag stiffness of the blade section continues to increase through the transition from rectangular to circular section heading towards the center of the rotor. This continually increasing stiffness is accomplished through an increase in the blade section depth, or a "flaring" of the blade shape from outer to inner sections. Additional stiffness is gained from the structural properties of an inner titanium cuff that runs continuously between and functionally couples the composite blade and rotor shank, which in turn is coupled to a hub feathering joint. The change in departure angle of the spar at the point of flaring may cause stress risers or kink loads in the case of a composite spar. These loads can be addressed with the application of a bulkhead in the titanium cuff, or external circumferential fiber wraps or riveting of the composite shell to the inner titanium cuff at the point of the kink initiation.

A composite laminate in the generally rectangular portion of the spar can have an advantageously tailored layup and associated structural properties. It is contemplated that a laminate composed of primarily unidirectional material could be used in the caps of the rectangular section. Such a laminate might extend around sides of the spar section and could comprise primarily biased angle material on the webs of the beam sides, which excels in transferring shear loads. Biased material on the sides is fastened through to the titanium cuff, providing a redundant load path in the event of composite to metal de-bonding. The biased laminate composition in this segment allows for increased strength in the presence of the holes drilled for the fastener attachments.

FIG. 5, FIG. 6, and FIG. 7 illustrate a preferred blade structure 500 from an isometric view in FIG. 5, a side view in FIG. 6, and a top view in FIG. 7. The blade structure 500 comprises a spar 510, a shank 540, and a cuff 530 that transitions between a section of the spar near the shank 520 and the shank 540. The shank 540 has a first section depth 582, which in the case of a circular shank 540 is equal to the diameter and width 592 of the shank 540. The section of the spar near the shank 520 has a second section depth 580 and a width 590. The cuff 530 acts as a transition between the spar 510 and the shank 540, reducing section depth. The cuff has a length 596 that can be expressed as a percentage of the total rotor blade length 598. The spar 510 runs from the section of the spar near the shank 520 to a tip 512 having a section depth 584. In preferred embodiments, a portion of the spar 510 might be disposed within the cuff 530. For tiltrotor applications, the spar 510 can be advantageously twisted from the tip 512 to the section of the spar near the shank 520, by a total twist angle sufficient to accommodate an efficient blade aerodynamic layout. Total twist angles of 15°, 20°, 30°, or even 40° are contemplated for tiltrotor blades.

In especially preferred embodiments, the cuff 530 serves as a transition between the spar 510 and the shank 540 that reduces section depth by at least 15%, 20%, 25%, 30%, 40%, or even 50% over 20%, 15%, 10%, or even 5% of a total length of the rotor blade. In a most preferred embodiment, as depicted in FIG. 6, the shank 540 has a first section depth 582 at an interface with transition 530 that is reduced by 40% at an intermediate section 538 which is the interface between spar and transition, thereby accomplishing a transition reducing section depth by 40% over 6% of the length of the rotor blade 598. Section width is also somewhat reduced over the transition between the spar and the shank, as shown in FIG. 7, but by less than 60%, 50% or 40% of the reduction in section depth over the same percentage of the total length of the rotor blade. Section width influences blade lagwise bending stiffness, but is of less importance for blade flap bending.

It is contemplated that the cuff 530 can be made of any suitable material, but titanium is especially preferred. In preferred embodiments, the shape of the section of the spar near the shank 520 is largely rectangular with a rapid transition to a circular shape at shank 540 at the root end of the blade, which serves as a bolt interface for feathering the blade structure 500.

In FIG. 6 the relatively thin rectangular shape of the blade spar 510 and the section of the spar near the shank 520 can be seen transitioning to the circular shape of the shank 540 rapidly with an increase in section depth or "flare", over the cuff 530.

FIG. 8 depicts a preferred blade root area 800 with an aerodynamic fairing 810 installed. The aerodynamic fairing 810 comprises a skin, preferably of carbon composite, that follow the shape of one or more airfoil profiles 812. The blade spar 510 is advantageously disposed within the aerodynamic fairing 812 to promote smooth flow over a range of axial Mach numbers. The blade is configured to rotate in pitch, or feather, about a feather axis 802. It is contemplated that the cuff 530 could have a multi-celled structure comprising a plurality of structural boxes 532, 534, 536 integrating with a multi-celled structure in the blade spar 510. The generally rectangular cross-section of the spar 510 can be seen transitioning to a generally circular cross-section of the shank 540.

FIG. 9 is a detail of a preferred root cuff and blade structure 900. The blade spar 510 is preferably of multi-cell construction, advantageously comprising a first structural cell 512, second structural cell 514, and third structural cell 516. The spar 510 can be made by any suitable construction, but laminated graphite composite spars are especially preferred. An upper cap region 930 of the blade spar 510 can advantageously comprise first and second laminate layers 936, 938 with different fiber orientations. Structural cells 512, 514, 516 of the blade spar are separated by composite internal webs 932, 934. It is contemplated that these internal webs 932, 934 could be continued into the cuff structure 530 with cuff internal webs 922, 924, even if the cuff is made of a metal such as titanium.

From FIG. 9, it may be observed that the cuff serves as a transition 920 between a blade spar 510 and a metal blade root shank 540. The shank can advantageously be configured with internal webs 942, 944 for structural flap bending strength and holes 548 for attachment to a hub or other blade supporting structure. It is further contemplated that composite and titanium components may be bonded together, which bonding may be supplemented with fasteners to act as a redundant load path in the event of bond failure. It is thus contemplated that the internal webs 922, 924 of a composite spar 510 could be structurally coupled to the internal webs 942, 944 of the shank 940. Such coupling can be readily accomplished by bonding or riveting.

Figure 10:
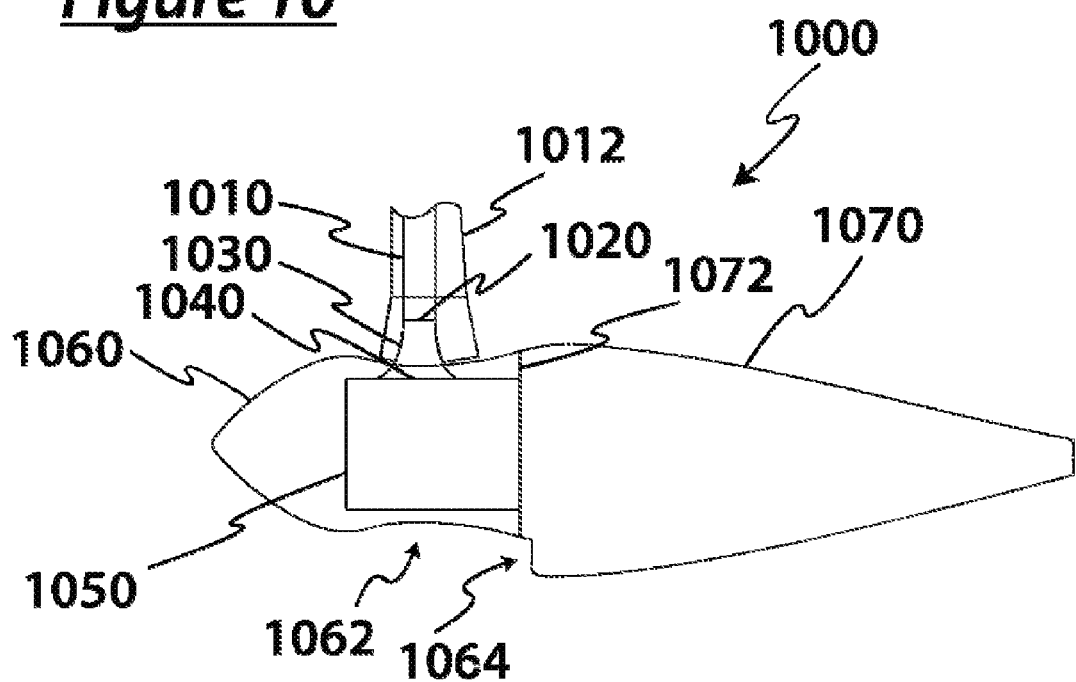
FIG. 10 is a side-view of a preferred blade-nacelle interface.

FIG. 10 is a side-view illustration of a preferred blade-nacelle interface 1000. A blade comprising a spar 1010, aerodynamic fairing 1012, section of the spar near the shank 1020, cuff 1030 acting as a transition to a shank 1040. The shank 1040 is coupled to a rotating hub 1050, which in turn, is coupled to a tilting nacelle 1070 through a rotating interface 1072. The hub 1050 and blade shank 1040 are at least partly disposed in a spinner 1060, which acts as an aerodynamic fairing. The spinner is advantageously configured with a concave region 1062, reducing the spinner diameter by 3%, 5%, or even 10% from a maximum spinner diameter. This concave region 1062 effectively slows the airflow as it passes over the thick blade root region, allowing the aircraft to fly faster. The blade cuff 1030 and aerodynamic fairing 1012 are also configured to provide smooth airflow into an engine inlet 1064.

Application of the teachings found in this specification allow for relatively smooth airflow at Mach 0.55, 0.60, or even 0.65 around the nacelle 1070 and the absence of a shock wave at the engine inlet 1060 to the engine even given the relatively thick blade aerodynamic fairing 1012 and associated airfoils. As used herein, a "relatively thick" airfoil has a thickness-to-chord ratio of at least 18%, 20%, 23%, 27%, or even 30%.

In general then, rotor blades are contemplated that comprise a shank root having a first section depth, a spar having a second section depth near the root and shank, and a transition between the shank and the spar section that reduces section depth by at least 20%, 25% or 30% over 5%, 8% or 10% of a total length of the rotor blade. The shank preferably has a generally circular cross-section, and the spar near the root preferably has a generally rectangular cross-section, with at least two internal structural boxes, and having an external profile that fits within an airfoil shape. Independently, the spar also preferably includes at least two internal structural boxes.

In especially preferred embodiments, the rotor blade spar is configured to have a high stiffness-to-weight ratio, which is defined herein as least 80 lb-in$^2$ per inch of section depth squared/lb weight. More preferably, the rotor has a stiffness-to-weight ratio of at least to 100 lb-in$^2$ per inch of section depth squared/lb weight. A composite rotor blade spar is configured to achieve such a stiffness by advantageous selection of fibers and resins in laminate layers of an upper cap portion.

In other aspects of contemplated methods, the step of transitioning can advantageously comprise transitioning to a circular interface at a rotating joint on a rotor hub, the shank or interface having a diameter or section depth of at least 16, 18, 20, 22 or 24 inches. Viewed from another aspect, then the rotor traces out a rotor diameter, and the step of transitioning can further comprise transitioning to a circular interface at a rotating joint on a rotor hub, the interface having a diameter of at least 2.5%, 3% or 3.5% of the rotor diameter.

Figure 2:
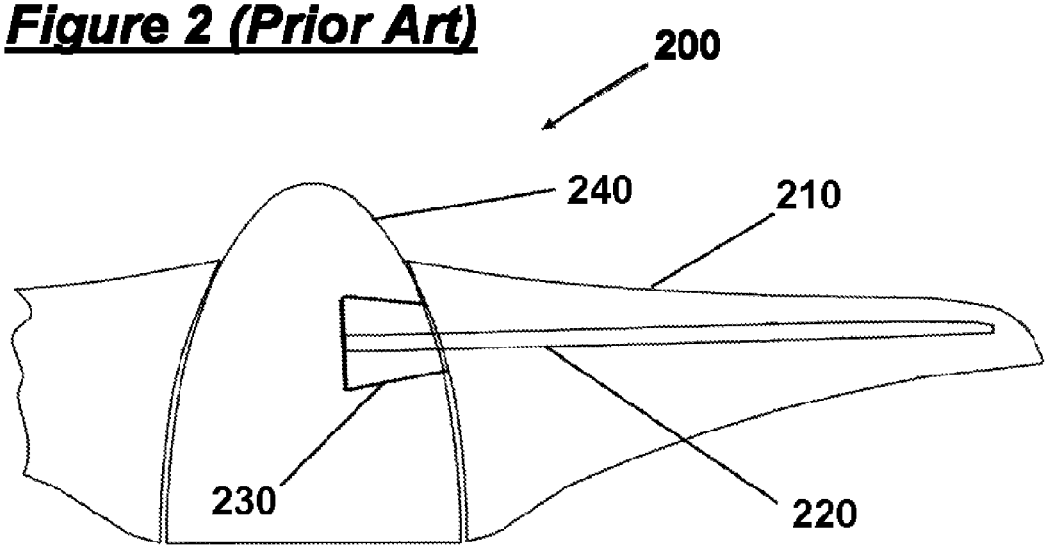
FIG. 2 is a schematic depicting a prior art propeller blade root, aerodynamic fairing, and hub attachment.
Figure 3:
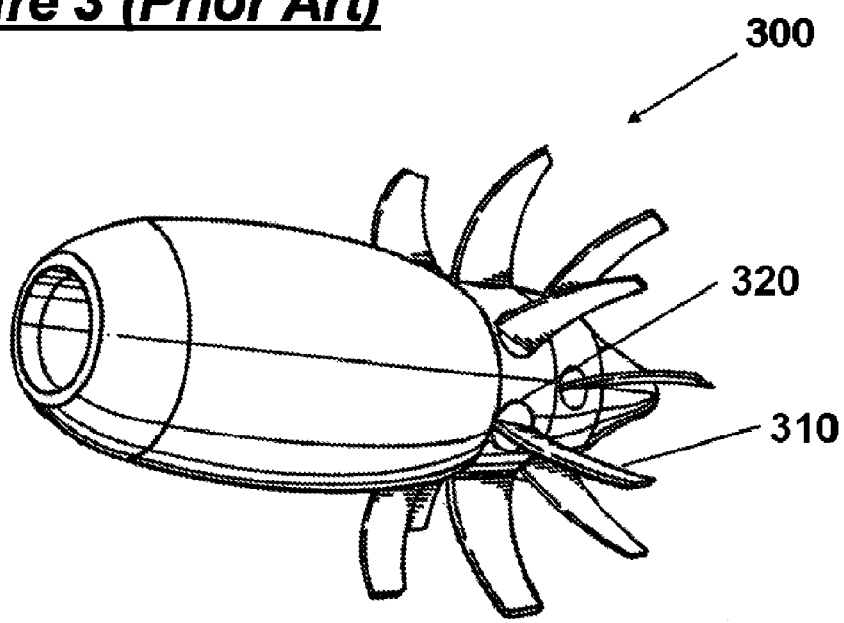
FIG. 3 is an isometric view of a prior art propfan and blades.
Figure 4:
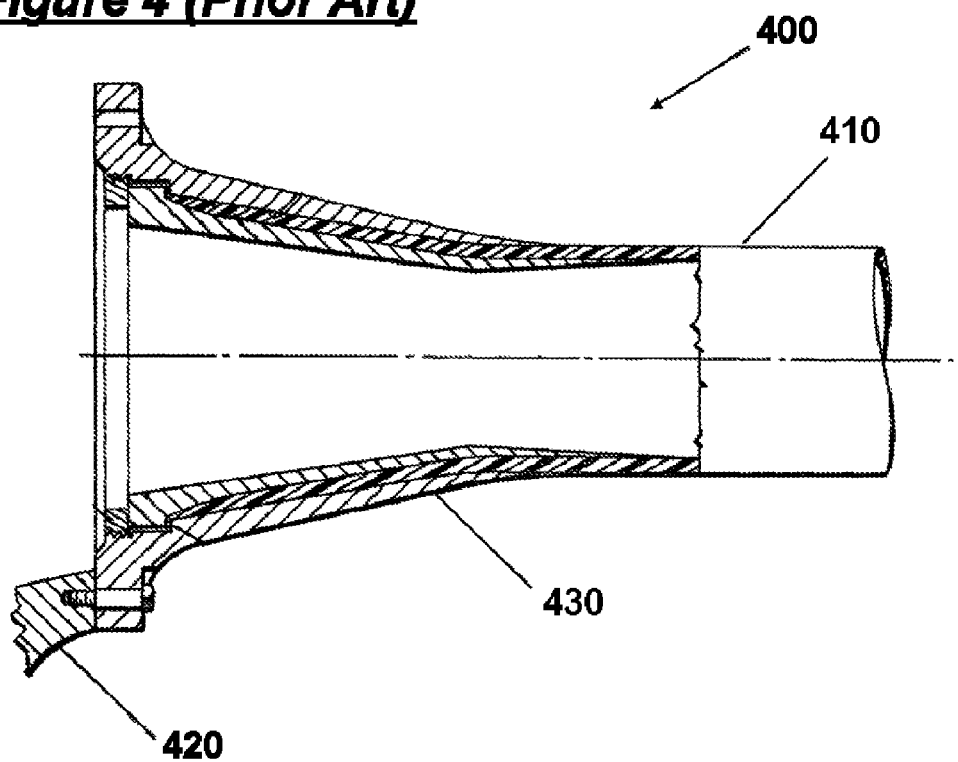
FIG. 4 is a cutaway of a prior art blade root and attachment.
Figure 11:
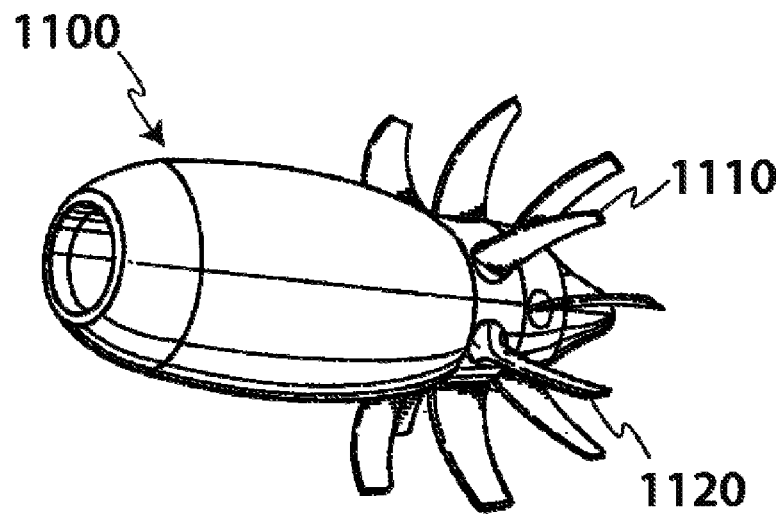
FIG. 11 is an isometric view of a preferred improved propfan propulsion system.
Figure 12:
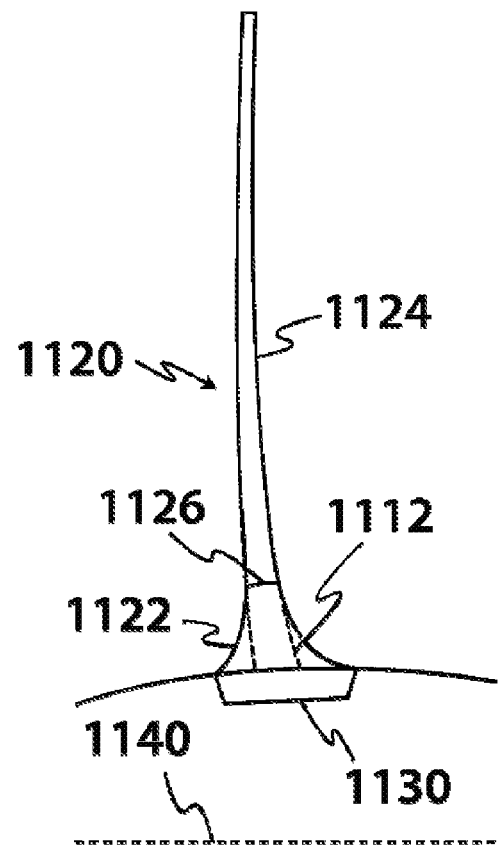
FIG. 12 is a schematic view of blade 1120 of FIG. 11.

FIG. 11 is a depiction of a preferred improved propfan 1100. The propfan 1100 comprises a blade according to the prior art 1110 and a preferred improved blade 1120. It is contemplated that for a commercially practicable propfan, all blades are likely to be substantially identical. In FIG. 12, improved blade 1120 of the propfan 1100 is relatively thin and comprises an aerodynamic fairing 1124. For blade 1120, a cuff 1122 could serve to flare and transition from a blade root section 1126 to a generally circular pitch change mechanism 1130. The blade 1120 rotates about an axis of rotation 1140. The improved blade cuff 1122 is seen to be somewhat thicker than a prior art blade root profile 1112, enabling greater stiffness and structural capacity. Thus it is seen that a propfan propulsion system could be readily modified to include a rapid shank to root transition as discussed elsewhere herein. It is contemplated that the inventive subject matter could also readily be applied to other propeller or rotor systems, including those shown in prior art FIG. 1 and FIG. 2.

Contemplated methods include methods of facilitating greater axial flow speed limits of a rotor in a rotorcraft or tiltrotor aircraft, comprising including a spar serving as a support structure within the rotor, and increasing root flap stiffness by flaring a shank-to-root transition in a manner that increases section depth (moving inboard along the blade) by at least 20%, 25% or 30% over 5%, 8%, or 10% of a total length of the rotor. Such methods are thought to be especially useful in a hingeless or rigid rotor system, an unducted fan, a propfan, or a geared turbofan. Such methods can also include the step of transitioning from a composite containing spar to a metal containing shank.

Contemplated methods also include achieving at least one of a high stiffness-to-weight ratio in a rotor blade of an aircraft, comprising: providing the rotor blade with a blade depth that satisfies aerodynamic flight requirements for at least one of (a) an axial flow through the rotor of at least Mach 0.35, 0.5, 0.6, or 0.65 and (b) an edgewise flow across the rotor of at least Mach 0.15, 0., or 0.25; and transitioning the rotor blade from a rectangular multi-cell blade to a multi-cell spar. In more preferred embodiments, the methods include providing a blade depth that satisfies aerodynamic flight requirements for at least one of (a) an axial flow through the rotor of at least Mach 0.5 or 0.6, and (b) an edgewise flow across the rotor of at least Mach 0.2, 0.25 or 0.3.

Thus, specific embodiments and applications of a composite blade root structure have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A rotor blade comprising:
   a shank;
   a spar comprising a composite material, and first and second internal structural cells separated by a first internal web;
   a multi-cell cuff that couples the shank to the spar, having a second internal web that is structurally connected with the first web;
   the shank having a first section depth at a first interface with the cuff;
   the spar having a second section depth at a second interface with the cuff, the second section depth being no greater than 80% of the first section depth; and
   wherein a smallest distance between the first and second interfaces is at most 10% of a total length of the rotor blade.

2. The rotor of claim 1, wherein the shank has a generally circular cross-section.

3. The rotor of claim 2, wherein the spar near the shank has a generally rectangular cross-section.

4. The rotor of claim 1, wherein the spar has a flap stiffness of at least 80 lb-in$^2$ per inch of section depth squared/lb weight.

5. The rotor of claim 1, wherein the spar has a flap stiffness of at least 100 lb-in$^2$ per inch of section depth squared/lb weight.

6. The rotor of claim 1, wherein the second section depth is no greater than 75% of the first section depth; and the smallest distance between the first and second interfaces is at most 5% of the total length of the rotor.

7. The rotor of claim 1, wherein the rotor blade has a skin that comprises a composite material.

8. The rotor of claim 1, wherein the shank comprises a metal.

9. The rotor of claim 1, wherein the spar has a third internal web, the cuff has a fourth internal web, and the third and fourth internal webs are structurally connected.

10. The rotor of claim 1, wherein the spar is at least partly disposed within the cuff.

11. The rotor of claim 1, wherein shank section depth is at least 20 inches.

12. The rotor of claim 1, wherein the spar is twisted by an angle of at least 20 degrees.

13. The rotor of claim 1, wherein the shank has a third internal web that is structurally connected with the second web.

* * * * *